(12) United States Patent
Yu et al.

(10) Patent No.: US 12,024,621 B2
(45) Date of Patent: Jul. 2, 2024

(54) FOAM BEAD AND SINTERED FOAM STRUCTURE

(71) Applicant: Dow Global Technologies LLC, Midland, MI (US)

(72) Inventors: Haiyang Yu, Shanghai (CN); Jinliang Yan, Shanghai (CN); Yunfeng Yang, Shanghai (CN); Jozef J. I. Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 687 days.

(21) Appl. No.: 17/255,221

(22) PCT Filed: Jun. 29, 2018

(86) PCT No.: PCT/CN2018/093539
§ 371 (c)(1),
(2) Date: Dec. 22, 2020

(87) PCT Pub. No.: WO2020/000339
PCT Pub. Date: Jan. 2, 2020

(65) Prior Publication Data
US 2021/0277214 A1 Sep. 9, 2021

(51) Int. Cl.
| | | |
|---|---|---|
| C08L 23/08 | (2006.01) | |
| C08J 9/00 | (2006.01) | |
| C08J 9/12 | (2006.01) | |
| C08J 9/16 | (2006.01) | |
| C08J 9/232 | (2006.01) | |
| C08L 53/00 | (2006.01) | |

(52) U.S. Cl.
CPC ......... *C08L 23/0876* (2013.01); *C08J 9/0061* (2013.01); *C08J 9/122* (2013.01); *C08J 9/16* (2013.01); *C08J 9/232* (2013.01); *C08L 53/00* (2013.01); *C08J 2203/06* (2013.01); *C08J 2300/105* (2013.01); *C08J 2323/08* (2013.01); *C08J 2353/00* (2013.01); *C08J 2400/105* (2013.01); *C08J 2423/08* (2013.01)

(58) Field of Classification Search
CPC ...... C08L 23/0876; C08L 53/00; C08L 23/06; C08L 23/12; C08L 2423/08; C08J 9/0061; C08J 9/122; C08J 9/16; C08J 9/232; C08J 2203/06; C08J 2300/105; C08J 2323/08; C08J 2353/00; C08J 2400/105; C08J 2423/08
See application file for complete search history.

(56) References Cited

U.S. PATENT DOCUMENTS

| | | |
|---|---|---|
| 3,264,272 A | 8/1966 | Watkin |
| 4,101,445 A | 7/1978 | Levine et al. |
| 4,302,565 A | 11/1981 | Goeke et al. |
| 4,351,931 A | 9/1982 | Armitage |
| 4,508,842 A | 4/1985 | Beran et al. |
| 4,690,981 A | 9/1987 | Statz |
| 4,973,299 A | 11/1990 | Rubin et al. |
| 5,272,236 A | 12/1993 | Lai et al. |
| 5,278,272 A | 1/1994 | Lai et al. |
| 5,317,036 A | 5/1994 | Brady, III et al. |
| 5,332,793 A | 7/1994 | Cann |
| 5,342,907 A | 8/1994 | Cann et al. |
| 5,371,145 A | 12/1994 | Daniell et al. |
| 5,405,901 A | 4/1995 | Daniell et al. |
| 5,410,003 A | 4/1995 | Bai |
| 6,593,383 B2 | 7/2003 | Yanagihara et al. |
| 7,608,668 B2 | 10/2009 | Li Pi Shan et al. |
| 9,827,467 B2 | 11/2017 | Sullivan et al. |
| 10,526,436 B2 | 1/2020 | Wu et al. |
| 2006/0063888 A1 | 3/2006 | Dean |
| 2006/0205832 A1 | 9/2006 | Dean |
| 2009/0130355 A1 | 5/2009 | Chen et al. |
| 2010/0112235 A1 | 5/2010 | Prinz et al. |
| 2018/0291169 A1 | 10/2018 | Yu et al. |

FOREIGN PATENT DOCUMENTS

| | | |
|---|---|---|
| CN | 107709442 A | 2/2018 |
| EP | 0043052 A1 | 1/1982 |
| JP | 10204203 A | 8/1998 |
| JP | 2003049030 A | 2/2003 |
| JP | 2011153260 A | 8/2011 |
| JP | 20222053260 A | 8/2011 |
| JP | 5571733 B2 | 8/2012 |
| JP | 098161 A | 5/2014 |
| JP | 2014136710 A | 7/2014 |
| JP | 2017035468 A | 2/2017 |
| TW | 201807049 A | 1/2018 |
| WO | 2008129653 A1 | 10/2008 |

(Continued)

OTHER PUBLICATIONS

Du Pont Packaging & Industrial Polymers, DuPont HPF resin Product Sheet, HPF AD1035 (Year: 2015).*
Chinese Search Report and Written Opinion dated Jul. 11, 2022, pertaining to Chinese Patent Application No. 2018800962703 9 pages.
Indian Office Action dated Aug. 22, 2022, pertaining to Indian Patent Application No. 202017057064 9 pages.
Chinese Office Action dated Jul. 11, 2022, pertaining to Chinese Patent Application No. 201880096270.3 6 pages.
Chinese Office Action dated Jan. 12, 2023 pertaining to Chinese Patent Application No. 201880096270.3 6 pages.
International Search Report and Written Opinion pertaining to PCT/CN2018/093539, dated Mar. 28, 2019.
Raps, Daniel, et al., "Past and present developments in polymer bead foams and bead foaming technology," Polymer, vol. 56 (2015) 5-19.

(Continued)

*Primary Examiner* — John M Cooney
(74) *Attorney, Agent, or Firm* — Dinsmore & Shohl LLP

(57) ABSTRACT

A foam bead is formed from a composition comprising an ionomer comprising, in polymerized form, ethylene, an unsaturated acid comonomer and, optionally, an acrylate comonomer, wherein the unsaturated acid comonomer is at least partially neutralized with a neutralizing agent. A sintered foam structure is formed from foam beads that are formed from above composition.

7 Claims, 4 Drawing Sheets

(56) References Cited

FOREIGN PATENT DOCUMENTS

| WO | 2016174219 A1 | 11/2016 |
| WO | 2017000162 A1 | 1/2017 |
| WO | 2017172936 A1 | 10/2017 |

OTHER PUBLICATIONS

Scholte, Th.G., et al., "Mark-Houwink equation and GPC calibration for linear short-chain branched polyolefines, including polypropylene and ethylene-propylene copolymers," J. Appl. Sci., 29 (1984) 3763-378.

Otocka, E.P., et al., "Distribution of long and short branches in low-density polyethylenes," Marcromolecules, 4 (1971), 507-512.

Mourey & Balke, Chromotography of Polymers, Chpt 12, "A Strategy for Interpreting Multidector Size-Exclusion Chromatography Data. I. Development of a Systematic Approach", ACS Symposium Series, 52, 1992.

Balke & Mourey, Chromotography of Polymers Chpt 13, "A Strategy for Interpreting Multidector Size-Exclusion Chromatography Data. II. Applications in Plastic Waste Recovery", ACS Symposium Series, 52, 1992.

Korean Office Action dated Feb. 16, 2023, pertaining to Korean patent application 10-2021-7002533, 10 pages.

Hayashi H et al: "Polyethylene ionomer-based nano-composite foams prepared by a batch process and MuCellA(R) injection molding", Materials Science and Engineering C, Elsevier Sciences. A, CH, vol. 30, No. 1, Jan. 1, 2010 (Jan. 1, 2010), pp. 62-70.

Extended European Search Report, dated Jan. 19, 2022, pertaining to Patent application No. 18924137.5.

Japanese Office Action pertaining to JP 2020-0572900, dated Jun. 28, 2022, 4 pages.

Chinese Final Rejection, dated May 23, 2023, pertaining to Chinese Patent Application No. 201880096270.3, 7 pages.

Dobrynin, A.V., "Phase coexistence in random copolymers", J. Chem. Phys., vol. 107, No. 21, Jan. 12, 1997 pp. 9234-9238.

I.I. Potemkin, S.V. Panyukov, "Microphase separation in correlated random copolymers: Mean-field theory and fluctuation corrections", Physical Review E, vol. 67, No. 6, Jun. 1998, pp. 6904-6912.

Bernhard Wunderlich, Thermal Characterization of Polymeric Materials, Chapter 2, 92, 277-278, (Edith A. Turi ed., 2nd ed, 1997).

Vietnamese Office Action, dated Aug. 9, 2023, pertaining to Vietnamese Patent Application No. 1-2021-00445, 4 pgs.

* cited by examiner

FOAM BEAD AND SINTERED FOAM STRUCTURE

BACKGROUND

Polyethylene foams are utilized in footwear components, such as midsole applications. Crosslinked ethylene-based polymers including ethylene vinyl acetate (EVA) copolymer and polyolefin elastomers have traditionally dominated the polyethylene foam market in footwear as they can easily be foamed with a chemical blowing agent. However, chemical blowing agents are known to produce unpleasant odors and contaminate molds.

Furthermore, crosslinked ethylene-based polymer foams are not recyclable because they are thermoset (rather than thermoplastic). In other words, crosslinked ethylene-based polymer foam beads cannot be fused together to form a uniform sintered foam structure, such as a foam midsole. Consequently, crosslinked ethylene-based polymer foams are not traditionally prepared using a foam bead process, which utilizes a physical blowing agent.

Bead foaming traditionally includes two steps: production of the foam beads and steam-chest molding. In other words, particularly in midsole applications, the foaming step is separated from the molding step. No foaming or expansion of the foam beads occurs during the molding process; the final product size is therefore the same as the mold size. In the footwear industry, this is called 1 to 1 foaming. As will be appreciated, 1 to 1 foaming may enable over-molding and the direct attachment of a bead foam-based structure (such as a midsole) to another structure of a different material (such as a rubber outsole). In order to utilize the 1 to 1 foaming for over-molding and/or direct attachment, the material of the foam beads must exhibit good foamability and the skin on the foam beads must melt/soften at molding temperatures and at the same time the cell must resist shrinkage.

The art recognizes the need for a polymeric material for foam bead applications that exhibits suitable density for foam sole and foam midsole applications. The art also recognizes the need for a sintered foam structure that exhibits suitable density for foam sole and foam midsole applications.

SUMMARY

The instant disclosure provides a sintered foam structure. In an embodiment, a sintered foam structure is formed from foam beads that are formed from a composition comprising: an ionomer comprising, in polymerized form, ethylene, an unsaturated acid comonomer, and, optionally, an acrylate comonomer, wherein the unsaturated acid comonomer is completely or partially neutralized with a neutralizing agent.

The instant disclosure further provides a foam bead. In an embodiment, a foam bead is formed from a composition comprising: an ionomer comprising, in polymerized form, ethylene, an unsaturated acid comonomer, and, optionally, an acrylate comonomer, wherein the unsaturated acid comonomer is completely or partially neutralized with a neutralizing agent.

DEFINITIONS

Figure 1:
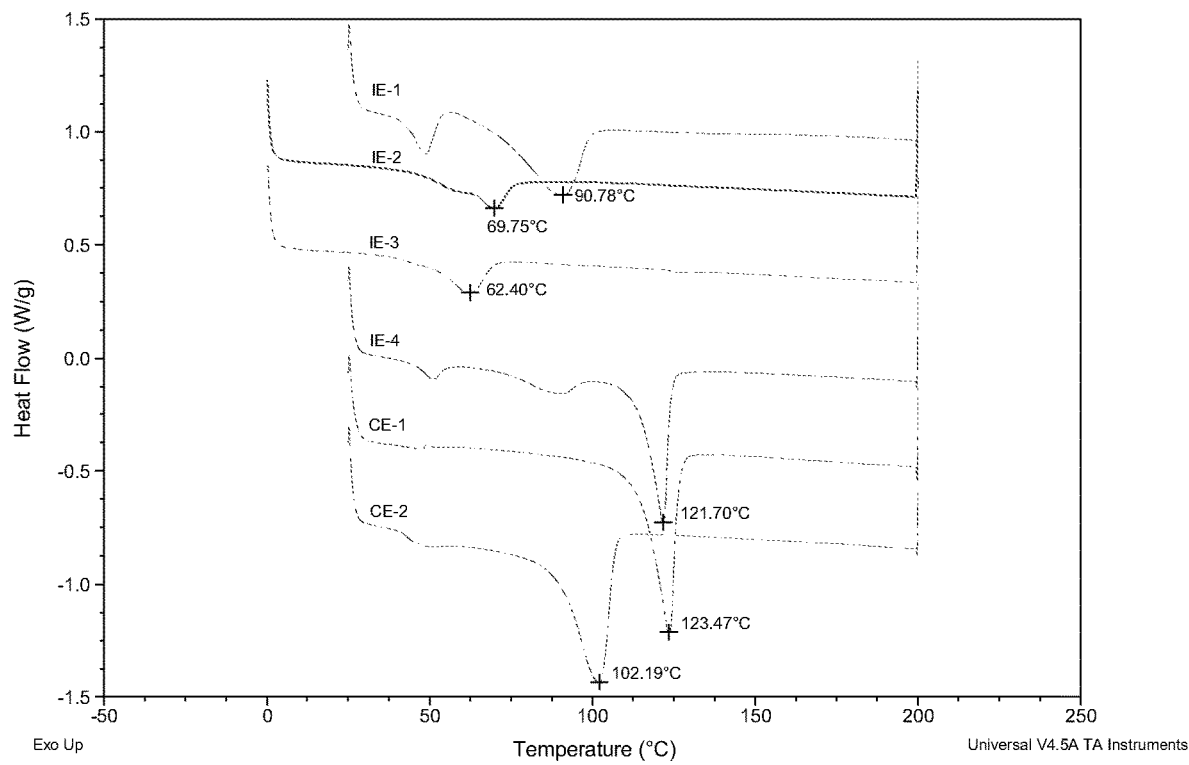
FIG. 1 is a graph showing the $1^{st}$ heating curve of the pellets of Inventive Examples 1-4 and Comparative Samples 1 and 2, as measured by DSC.

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

An "alkenyl group" is a hydrocarbyl group containing at least one C=C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc. An alkenyl group may be substituted. A "substituted alkenyl group" is an alkenyl group in which one or more hydrogen atoms bound to any of the carbon atoms is replaced by another group, such as a heteroatom (i.e., N, O, P, B, S, Si, Sb, Al, Sn, As, Se and Ge), a heteroalkyl group (e.g., a cyano group, a benzoyl group, a 2-pyridyl group, a 2-furyl group), a halogen, an aryl group, a substituted aryl group, a heteroaryl group, a substituted heteroaryl group, a cycloalkyl group, a substituted cycloalkyl group, a heterocycloalkyl group, a substituted heterocycloalkyl group, a haloalkyl group, a hydroxyl group, an amino group, a phosphido group, an alkoxy group, an aryloxy group, a voryl group, a phosphino group, a silyl group, a seleno group, a thio group, a nitro group, and combinations thereof. The bond between a carbon atom of the alkenyl group and a heteroatom may be saturated or unsaturated.

An "alkyl group" is a saturated linear, cyclic or branched hydrocarbyl group. Nonlimiting examples of suitable alkyl groups include methyl groups, ethyl groups, n-propyl groups, i-propyl groups, n-butyl groups, t-butyl groups, i-butyl groups (or 2-methylpropyl groups), etc. An alkyl group may be substituted. A "substituted alkyl group" is an alkyl group in which one or more hydrogen atoms bound to any of the carbon atoms is replaced by another group, such as a heteroatom (i.e., N, O, P, B, S, Si, Sb, Al, Sn, As, Se and Ge), a heteroalkyl group (e.g., a cyano group, a benzoyl group, a 2-pyridyl group, a 2-furyl group), a halogen, an aryl group, a substituted aryl group, a heteroaryl group, a substituted heteroaryl group, a cycloalkyl group, a substituted cycloalkyl group, a heterocycloalkyl group, a substituted heterocycloalkyl group, a haloalkyl group, a hydroxyl group, an amino group, a phosphido group, an alkoxy group, an aryloxy group, a voryl group, a phosphino group, a silyl group, a seleno group, a thio group, a nitro group, and combinations thereof. The bond between a carbon atom of the alkyl group and a heteroatom may be saturated or unsaturated.

An "alpha-olefin" or α-olefin" is a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins from which the elastomers are prepared include ethene, propylene, 1-butene, 1-pentene, 1-hexene, 1-octene, 1-dodecene, and mixtures of two or more of these monomers.

An "elastomer" is a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

An "ethylene-based polymer" or "ethylene polymer" is a polymer that contains a majority amount of polymerized ethylene based on the weight of the polymer, and, optionally, may comprise at least one comonomer. An "ethylene-based interpolymer" is an interpolymer that contains, in polymerized form, a majority amount of ethylene, based on the weight of the interpolymer, and at least one comonomer. Preferably, the ethylene-based interpolymer is a random interpolymer (i.e., comprises a random distribution of it monomeric constituents). A nonlimiting example of a suitable ethylene-based interpolymer is an ethylene plastomer/elastomer.

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer, and an α-olefin, as the only two monomer types.

"Foam bead" refers to a foamed particle formed by saturating a polymer particle (for example, a pellet or granular particle, preferably a pellet) in the presence of a blowing agent, such as an inert gas (e.g., $CO_2$ or $N_2$) at a temperature within 30° C., or within 25° C., or within 20° C. of the highest melting temperature (Tm) of the polymer particle and a pressure from 50 Bar to 200 Bar. The saturation typically occurs for a time such that the diameter (defined as the longest dimension) of the polymer particle increases, upon depressurization, by at least 50%, or at least 60%, or at least 70%, or at least 80%, or at least 90%, or at least 100% relative to its original diameter before foaming. Typically, a saturation time is from 6 minutes, or 10 minutes, or 15 minutes, or 20 minutes, or 30 minutes to 60 minutes, or 90 minutes, or 120 minutes. Here, the "highest melting temperature (Tm)" refers to the Differential Scanning Calorimetry (DSC) melting peak having the highest peak temperature.

A "hydrocarbyl group" is a substituent containing only hydrogen and carbon atoms, including branched or unbranched, saturated or unsaturated, cyclic, polycyclic or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl-, alkylaryl-, and alkynyl-groups.

An "interpolymer" is a polymer prepared by the polymerization of at least two different types of monomers. The generic term interpolymer thus includes copolymers (employed to refer to polymers prepared from two different types of monomers), terpolymers (employed to refer to polymers prepared from three different types of monomers), and polymers prepared from more than three different types of monomers.

An "ionomer" is a polymer comprising units derived from at least one nonionic monomer and units derived from at least one unsaturated acid comonomer, wherein the units derived from the unsaturated acid comonomer are at least partially neutralized by a neutralizing agent.

A "neutralizing agent" is chemical having an ionic charge and used to partially or completely neutralize another chemical. Nonlimiting examples of neutralizing agents include NaOH, MgO, ZnO, $Al_2O_3$ and combinations thereof.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

An "olefin elastomer" or "polyolefin elastomer" or "POE" is an elastomeric polymer comprising at least 50 mole percent (mol %) of units derived from one or more olefins.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer.

A "propylene-based polymer" is a polymer that contains a majority amount of polymerized propylene based on the weight of the polymer, and, optionally, may comprise at least one comonomer.

A "propylene/alpha-olefin interpolymer" is an interpolymer that contains a majority amount of polymerized propylene, based on the weight of the interpolymer, and at least one α-olefin. A "propylene/α-olefin copolymer" is an interpolymer that contains a majority amount of polymerized propylene, based on the weight of the copolymer, and an α-olefin, as the only two monomer types.

"Sintered foam structure" refers to a foam structure formed by compressing foam beads, as described herein, typically under a vacuum, in the presence of a heating source. In an embodiment, the heating source is steam at a steam pressure greater than or equal to 0.5 Bar. The filling of a mold is typically done using a vacuum, such as at a pressure of less than 1 atmosphere.

"Sintering" is a process of heating and compacting foam beads and forming a mass of material without melting the whole foam beads to the point of liquefaction.

A "terpolymer" is a polymer prepared by the polymerization of three different types of monomers.

DETAILED DESCRIPTION

The instant disclosure provides a sintered foam structure. The sintered foam structure is formed from a composition comprising (A) an ionomer comprising, in polymerized form, ethylene, an unsaturated acid comonomer which is at least partially neutralized, and, optionally, an acrylate comonomer.

A sintered foam structure may comprise a combination of two or more embodiments as described herein.

(A) Ionomer

The present sintered foam structure includes an ionomer comprising, in polymerized form, ethylene, an unsaturated acid comonomer which is at least partially neutralized, and, optionally, an acrylate comonomer.

(i) Unsaturated Acid Comonomer

The ionomer includes units derived from an unsaturated acid comonomer. The unsaturated acid comonomer comprises a carboxylic acid group.

In an embodiment, the unsaturated acid comonomer has the Structure I

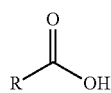

(Structure I)

wherein R is an unsaturated hydrocarbyl group. In an embodiment, R is a $C_1$-$C_{20}$ unsaturated hydrocarbyl group, preferably a $C_1$-$C_{10}$ unsaturated hydrocarbyl group. In an embodiment, R is a $C_1$-$C_{20}$ alkenyl group, preferably a $C_1$-$C_{10}$ alkenyl group.

In an embodiment, the unsaturated acid comonomer is acrylic acid or methacrylic acid. The option of either or both of these acids will be designated by the term "(meth) acrylic acid."

The ionomer contains from 5 wt %, or 8 wt %, or 10 wt % to 12 wt %, or 15 wt %, or 20 wt %, or 25 wt % unsaturated acid comonomer, based on the total weight of the ionomer.

The carboxylic acid groups of the unsaturated acid comonomer are at least partially neutralized with a neutralizing agent. Nonlimiting examples of neutralizing agents include metal ions, e.g., sodium, zinc, lithium, magnesium and combinations thereof. In embodiment, the metal ion is selected from the group consisting of sodium ions, zinc ions, magnesium ions and combinations thereof. Ions which produce more hydrophilic ionomers such as potassium are less preferred unless the degree of neutralization is low. Nonlimiting examples of neutralizing agents include NaOH, MgO, ZnO, $Al_2O_3$, and combinations thereof.

The ionomer is at least partially neutralized, that is, the carboxylic acid groups are at least partially neutralized or completely neutralized.

The carboxylic acid groups are from 5%, or 10%, or 15%, or 20%, or 25% to 30%, or 35%, or 40%, or 50%, or 60%, or 70%, or 80%, or 90%, or 100% neutralized. Preferably, the carboxylic acid groups are from 5%, or 10%, or 15%, or 20%, or 30% to 40%, or 50%, or 60% or 70% neutralized.

(ii) Acrylate Comonomer

The ionomer optionally includes units derived from an acrylate comonomer. The acrylate comonomer comprises an acryloyl group ($H_2C$=CH—C(=O)—).

In an embodiment, the acrylate comonomer is a compound having the Structure II

(Structure II)

wherein R' is an alkyl group. In an embodiment, R' is a $C_1$-$C_{20}$ alkyl group, preferably a $C_1$-$C_{10}$ alkyl group. In an embodiment, R' is a $C_1$-$C_8$ unsubstituted alkyl group.

In an embodiment, the acrylate comonomer is selected from methylacrylate and ethylacrylate.

The ionomer contains from 0 wt %, or 5 wt %, or 10 wt %, or 15 wt % to 20 wt %, or 25 wt %, or 30 wt %, or 40 wt % acrylate comonomer, based on the total weight of the ionomer.

In an embodiment, the ionomer is a terpolymer comprising, in polymerized form, ethylene, an unsaturated acid comonomer which is at least partially neutralized, and an acrylate comonomer.

The ionomers have a density from 0.940 g/cc, or 0.945 g/cc, or 0.950 g/cc, or 0.955 g/cc to 0.960 g/cc, or 0.965 g/cc, or 0.970 g/cc, or 0.975 g/cc, or 0.980 g/cc, as measured in accordance with ASTM D792.

The ionomers have a melt flow rate (190° C./2.16 kg) from 0.5 g/10 min, or 1.0 g/10 min, or 2 g/10 min, or 3 g/10 min to 4 g/10 min, or 5 g/10 min, or 7.5 g/10 min, or 10 g/10 min, or 12 g/10 min, or 15 g/10 min, as measured in accordance with ASTM D1238.

The ionomers have a melting point (DSC) from 50° C., or 55° C., or 60° C., or 65° C. to 70° C., or 75° C., or 80° C., or 85° C., or 90° C., or 95° C., or 100° C., or 105° C., or 110° C., as measured in accordance with ASTM D3418.

The ionomers have a Vicat softening point from 45° C., or 50° C., or 55° C. to 60° C., or 65° C., or 70° C., or 75° C., or 80° C., as measured in accordance with ASTM D1525.

The ionomers have a crystallinity from 4%, or 6%, or 8%, or 10%, or 12% to 14%, or 16%, or 18%, or 20%.

In an embodiment, the ionomer is an interpolymer comprising, in polymerized form, ethylene, an unsaturated acid conomoner which is at least partially neutralized, and, optionally, an acrylate comonomer, wherein the unsaturated acid comonomer is at least partially neutralized with a metal ion selected from sodium, magnesium, zinc, aluminum, and combinations thereof, and the ionomer has one, some or all of the following properties: (i) a density from 0.948 g/cc, or 0.950 g/cc, or 0.952 g/cc, or 0.954 g/cc to 0.956 g/cc, or 0.958 g/cc, or 0.960 g/cc, or 0.962 g/cc, as measured in accordance with ASTM D792; and/or (ii) a melt flow rate (190° C., 2.16 kg) from 0.5 g/10 min, or 1 g/10 min, or 2 g/10 min to 3 g/10 min, or 4 g/10 min, or 5 g/10 min, or 7.5 g/10 min, or 10 g/10 min, as measured in accordance with ASTM D1238; and/or (iii) a melting point (DCS) from 55° C., or 60° C., or 65° C. to 70° C., or 75° C., or 80° C., or 85° C., or 90° C., or 95° C., or 100° C., as measured in accordance with ASTM D3418; and/or (iv) a Vicat softening point from 50° C., or 52° C., or 54° C., or 56° C. to 58° C., or 60° C., or 65° C., or 70° C., or 75° C., as measured in accordance with ASTM D1525.

In an embodiment, the ionomer is an interpolymer comprising, in polymerized form, ethylene, an unsaturated acid conomoner which is at least partially neutralized, and, optionally, an acrylate comonomer, wherein the unsaturated acid comonomer is at least partially neutralized with a metal ion selected from sodium, magnesium, zinc, aluminum, and combinations thereof, and the ionomer has at least two, at least three, or all four of properties i.-iv. In an embodiment, the ionomer is an interpolymer comprising, in polymerized form, ethylene, an unsaturated acid conomoner which is at least partially neutralized, and, optionally, an acrylate comonomer, wherein the unsaturated acid comonomer is at least partially neutralized with a metal ion selected from sodium, magnesium, zinc, aluminum and combinations thereof, and the ionomer has at least property iv., or at least properties iv. and one of properties i.-iii.

In an embodiment, the ionomer is an interpolymer comprising, in polymerized form, ethylene, an unsaturated acid conomoner which is at least partially neutralized, and, optionally, an acrylate comonomer, wherein the unsaturated acid comonomer is at least partially neutralized with a metal ion selected from sodium, magnesium, zinc, aluminum, and combinations thereof, and the ionomer has each of properties (i)-(iii), above.

In an embodiment, the ionomer is an interpolymer comprising, in polymerized form, ethylene, an unsaturated acid conomoner which is at least partially neutralized, and, optionally, an acrylate comonomer, wherein the unsaturated acid comonomer is at least partially neutralized with a metal ion selected from sodium, magnesium, zinc, aluminum, and combinations thereof, and the ionomer has each of properties (i)-(iv), above.

In an embodiment, the ionomer is a terpolymer comprising, in polymerized form, ethylene, an unsaturated acid conomoner which is at least partially neutralized, and an acrylate comonomer, wherein the unsaturated acid comonomer is at least partially neutralized with a magnesium ion, and the ionomer has one, some or all of the following properties: (i) a density from 0.948 g/cc, or 0.950 g/cc, or 0.952 g/cc, or 0.954 g/cc to 0.956 g/cc, or 0.958 g/cc, or 0.960 g/cc, or 0.962 g/cc, as measured in accordance with ASTM D792; and/or (ii) a melt flow rate (190° C., 2.16 kg) from 0.5 g/10 min, or 0.75 g/10 min, or 1.0 g/10 min to 1.25 g/10 min, or 1.5 g/10 min, or 1.75 g/10 min, or 2.0 g/10 min, as measured in accordance with ASTM D1238; and/or (iii) melting point (DCS) from 55° C., or 60° C. to 65° C., or 70° C., as measured in accordance with ASTM D3418; and/or (iv) a Vicat softening point from 50° C., or 52° C., or 54° C. to 56° C. to 58° C., or 60° C., as measured in accordance with ASTM D1525.

In an embodiment, the ionomer is a terpolymer comprising, in polymerized form, ethylene, an unsaturated acid conomoner which is at least partially neutralized, and an acrylate comonomer, wherein the unsaturated acid comonomer is at least partially neutralized with a magnesium ion, and the ionomer has at least two, at least three, or all four of properties i.-iv. In an embodiment, the ionomer is a terpolymer comprising, in polymerized form, ethylene, an unsaturated acid conomoner which is at least partially neutralized, and an acrylate comonomer, wherein the unsaturated acid comonomer is at least partially neutralized with a magnesium ion, and the ionomer has at least property iv., or at least properties iv. and one of properties i.-iii.

In an embodiment, the ionomer is a terpolymer comprising, in polymerized form, ethylene, (meth) acrylic acid which is at least partially neutralized, and an alkyl acrylate comonomer, wherein the (meth) acrylic acid is at least partially neutralized with a magnesium ion, and the ionomer and has one, some or all of the following properties: (i) a density from 0.948 g/cc, or 0.950 g/cc, or 0.952 g/cc, or 0.954 g/cc to 0.956 g/cc, or 0.958 g/cc, or 0.960 g/cc, or 0.962 g/cc, as measured in accordance with ASTM D792; and/or (ii) a melt flow rate (190° C., 2.16 kg) from 0.5 g/10 min, or 0.75 g/10 min, or 1.0 g/10 min to 1.25 g/10 min, or 1.5 g/10 min, or 1.75 g/10 min, or 2.0 g/10 min, as measured in accordance with ASTM D1238; and/or (iii) melting point (DCS) from 55° C., or 60° C. to 65° C., or 70° C., as measured in accordance with ASTM D3418; and/or (iv) a Vicat softening point from 50° C., or 52° C., or 54° C. to 56° C. to 58° C., or 60° C., as measured in accordance with ASTM D1525.

In an embodiment, the ionomer is a terpolymer comprising, in polymerized form, ethylene, (meth) acrylic acid which is at least partially neutralized, and an alkyl acrylate comonomer, wherein the (meth) acrylic acid is at least partially neutralized with a magnesium ion, and the ionomer has at least two, at least three, or all four of properties i.-iv. In an embodiment, the ionomer is a terpolymer comprising, in polymerized form, ethylene, (meth) acrylic acid which is at least partially neutralized, and an alkyl acrylate comonomer, wherein the (meth) acrylic acid is at least partially neutralized with a magnesium ion, and the ionomer has at least property iv., or at least properties iv. and one of properties i.-iii Acid copolymers and their preparation are described in U.S. Pat. No. 4,351,931, and ionomers and their preparation from acid copolymers are described in U.S. Pat. No. 3,264,272. Ionomers containing acrylate comonomers are described in U.S. Pat. No. 4,690,981. Each of these patents is incorporated by reference.

The ionomer comprising, in polymerized form, ethylene, an unsaturated acid comonomer which is at least partially neutralized and, optionally, an acrylate comonomer, and further the ionomer comprising, in polymerized form, ethylene, an unsaturated acid comonomer which is at least partially neutralized and an acrylate comonomer, may comprise two or more embodiments discussed herein.

(B) Additional Optional Polymers

The composition optionally comprises one or more additional polymers. Nonlimiting examples of suitable additional polymers include ethylene-based polymers and propylene-based polymers.

(i) Ethylene-Based Polymers

The composition optionally includes an ethylene-based polymer. An ethylene-based polymer is an interpolymer comprising a majority mole percent (greater than 50 mol %) units derived from ethylene. In an embodiment, the ethylene-based polymer is an ethylene homopolymer or ethylene/alpha-olefin copolymer. Nonlimiting examples of suitable ethylene/alpha-olefin copolymers include copolymers of ethylene and one or more alpha-olefins having 3 to 12 carbon atoms. Suitable ethylene homopolymers and ethylene/alpha-olefin copolymers can be heterogeneous or homogeneous.

Typical catalyst systems which are used to prepare suitable ethylene homopolymers and ethylene/alpha-olefin copolymers are magnesium/titanium based catalyst, systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in UPS 4,973,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems which use chromium or molybdenum oxides on silica-alumina supports can be included here. Processes for preparing suitable ethylene homopolymers and ethylene/alpha-olefin copolymers are also described in the above-mentioned documents. In situ blends of polyethylene homopolymers and/or ethylene/alpha-olefin copolymers and processes and catalyst systems for providing the same are described in U.S. Pat. Nos. 5,371,145 and 5,405,901.

Nonlimiting examples of suitable ethylene homopolymers and ethylene/alpha-olefin copolymers include low density homopolymers of ethylene made by high pressure processes (HP-LDPE), linear low density polyethylenes (LLDPE), very low density polyethylenes (VLDPE), medium density polyethylenes (MDPE), high density polyethylene (HDPE) having a density greater than 0.940 g/cc, and metallocene copolymers with densities less than 0.900 g/cc.

VLDPE can be a copolymer of ethylene and one or more alpha-olefins having from 3 to 12 carbon atoms. The density of the VLDPE can be from 0.870 g/cc to 0.915 g/cc. The LLDPE can include VLDPE and MDPE, which are also linear, but, generally, have a density from 0.916 g/cc to 0.925 g/cc. LLDPE can be a copolymer of ethylene and one or more alpha-olefins having from 3 to 12 carbon atoms.

In an embodiment, the ethylene-based polymer, or further, the ethylene/alpha-olefin copolymer, is an ethylene/alpha-olefin multi-block interpolymer. In an embodiment, the ethylene/α-olefin multi-block interpolymer is an ethylene/α-olefin multi-block copolymer.

The term "ethylene/α-olefin multi-block interpolymer" refers to an ethylene/$C_4$-$C_8$ α-olefin multi-block copolymer consisting of ethylene and one or more copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. In an embodiment, the ethylene/α-olefin multi-block interpolymer is an ethylene/α-olefin multi-block copolymer. The term "ethylene/α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form, the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. An ethylene/α-olefin multi-block copolymer includes block copolymers with two blocks (di-block) and more than two blocks (multi-block). The $C_4$-$C_8$ α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole base ethylene/α-olefin multi-block copolymer, i.e., ethylene comprises at least 50 wt % of the whole base ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains from 50 wt %, or 60 wt %, or 65 wt % to 80 wt %, or 85 wt %, or 90 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole ethylene/octene multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in an base ethylene/α-olefin multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp. 9234-9238.

In an embodiment, the ethylene/α-olefin multi-block copolymer possesses a most probable distribution of block lengths.

Nonlimiting examples of suitable ethylene/α-olefin multi-block copolymer are disclosed in U.S. Pat. No. 7,608,668, the entire content of which is incorporated by reference herein.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$, where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 122° C., or 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties: (i) a Mw/Mn from 1.7, or 1.8 to 2.2, or 2.5, or 3.5; and/or (ii) a density from 0.850 g/cc, or 0.860 g/cc, or 0.865 g/cc, or 0.870 g/cc to 0.877 g/cc, or 0.880 g/cc, or 0.900 g/cc; and/or (iii) a melting point, Tm, from 115° C., or 118° C., or 119° C., or 120° C. to 121° C., or 122° C., or 125° C.; and/or (iv) a melt index (I2) from 0.1 g/10 min, or 0.5 g/10 min to 1.0 g/10 min, or 2.0 g/10 min, or 5 g/10 min, or 10 g/10 min, or 50 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% $min^{-1}$ deformation rate at 21° C. as measured in accordance with ASTM D1708; and/or (ix) a polydisperse distribution of blocks and a polydisperse distribution of block sizes; and/or (x) a Shore A hardness from 50, or 60, or 65, or 70, or 75 to 80, or 85, or 90. In a further embodiment, the ethylene/1-octene multi-block copolymer has all of the above properties (i)-(x).

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Michigan, USA.

In an embodiment, the ethylene-based polymer, or further, the ethylene/alpha-olefin copolymer, is polyolefin elastomer (POE). POEs are prepared with at least one metallocene catalyst. The POE may also be prepared with more than one metallocene catalyst or may be a blend of multiple elastomer resins prepared with different metallocene catalysts. In an embodiment, the POE is a substantially linear ethylene polymer (SLEP). SLEPs and other metallocene catalyzed elastomers described, for example, in U.S. Pat. No. 5,272,236, incorporated herein by reference. Nonlimiting examples of suitable POEs include ENGAGE™ elastomer resins available from the Dow Chemical Co., or EXACT™ polymers from Exxon or TAFMER™ polymers from Mitsui Chemical.

In an embodiment, the POE is an ethylene-based polymer, and further an ethylene-based copolymer. The ethylene-based copolymer comprises, in polymerized form, ethylene and an alpha-olefin comonomer. Nonlimiting examples of alpha-olefin comonomers include propylene, 1-butene, 1-pentene, 1-hexene, 1-octene, 1-dodecene, and mixtures of these or other comonomers. In an embodiment, the POE is an ethylene/1-octene copolymer or ethylene/1-butene copolymer.

The POE has a density from 0.850 g/cc, or 0.860 g/cc, or 0.870 g/cc to 0.880 g/cc, or 0.890 g/cc, or 0.900 g/cc, or 0.910 g/cc, as measured in accordance with ASTM D792.

The POE has a melt index from 0.25 g/10 min, or 0.5 g/10 min, or 1 g/10 min, or 5 g/10 min to 10 g/10 min, or 15 g/10 min, or 20 g/10 min, or 25 g/10 min, or 30 g/10 min, as measured in accordance with ASTM D1238 (190° C., 2.16 kg).

The ethylene-based polymer may comprise two or more embodiments discussed herein.

(ii) Propylene-Based Polymers

The composition optionally includes a propylene-based polymer. A propylene-based polymer is a polymer containing a majority mole percent (greater than 50 mol %) units derived from propylene. In one embodiment, the propylene-based polymer is a propylene homopolymer or a propylene-based interpolymer, and further a propylene-based copolymer.

In one embodiment, the propylene-based polymer is a propylene/alpha-olefin interpolymer, and further a propylene/alpha-olefin copolymer. Preferred α-olefins include, but are not limited to, ethylene and C4-C20 α-olefins, and preferably ethylene and C4-C10 α-olefins. More preferred α-olefins include ethylene, 1-butene, 1-pentene, 1-hexene, 1-heptene and 1-octene, and more preferred, include ethylene, 1-butene, 1-hexene and 1-octene, and further 1-hexene and 1-octene.

In an embodiment, the propylene-based polymers is a propylene-based plastomer or elastomer such as those sold under the tradename VERSIFY™ by The Dow Chemical Company.

The propylene-based polymer may comprise two or more embodiments discussed herein.

(C) Additives

The present composition may include one or more optional additives. Nonlimiting examples of suitable additives include nucleators (e.g., talc and polytetrafluoroethylene (PTFE)), processing aids, lubricants, stabilizers (antioxidants), foaming aids, surfactants, flow aids, viscosity control agents, coloring agents, copper inhibitors, inorganic fillers (e.g., calcium carbonate ($CaCO_3$), titanium dioxide ($TiO_2$)), and combinations thereof.

In an embodiment, the composition contains from 0 wt %, or 0.01 wt % to 0.3 wt %, or 0.5 wt %, or 1 wt %, or 2 wt %, or 3 wt %, or 5 wt % optional additive, based on the total weight of the composition.

The optional additive may comprise two or more embodiments discussed herein.

(D) Composition

The composition according to the present disclosure comprises (A) an ionomer comprising, in polymerized form, ethylene, an unsaturated acid comonomer which is at least partially neutralized, and, optionally, an acrylate comonomer. The composition contains from 25 wt %, or 30 wt %, or 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt % to 95 wt %, or 96 wt %, or 97 wt %, or 98 wt %, or 99 wt % or 100 wt % of the ionomer comprising, in polymerized form, ethylene, an unsaturated acid comonomer which is at least partially neutralized, and an acrylate comonomer, based on the total weight of the composition. In an embodiment, the composition contains from greater than or equal to 80 wt %, or greater than or equal to 85 wt %, or greater than or equal to 90 wt %, or greater than or equal to 95 wt %, or greater than or equal to 98 wt % to 99 wt %, or 100 wt % of the ionomer, based on the total weight of the composition. In an embodiment, the composition contains 100 wt % of the ionomer, based on the total weight of the composition.

In an embodiment, the composition consists essentially of, or consists of, the ionomer comprising, in polymerized form, ethylene, an unsaturated acid comonomer which is at least partially neutralized, and, optionally, an acrylate comonomer.

In an embodiment, the composition includes the ionomer comprising, in polymerized form, ethylene, an unsaturated acid comonomer which is at least partially neutralized, and, optionally, an acrylate comonomer to the exclusion of all other polymeric materials.

In an embodiment, the composition further comprises (B) at least one additional polymer.

In an embodiment, the (B) at least one additional polymer is an ethylene-based polymer. The composition comprises from 0 wt %, or 10 wt %, or 20 wt %, or 30 wt % to 40 wt %, or 50 wt %, or 60 wt %, or 70 wt % ethylene-based polymer, based on the total weight of the composition. In an embodiment, the composition comprises from 0 wt %, or 5 wt %, or 10 wt %, or 15 wt % to 20 wt %, or 25 wt %, or 30 wt %, or 35 wt %, or 40 wt % ethylene-based polymer, based on the total weight of the composition.

In an embodiment, the composition comprises an ethylene-based polymer which is an ethylene homopolymer, an ethylene/alpha-olefin copolymer, an ethylene/alpha-olefin multi-block copolymer, a POE, or a combination of two or more of such ethylene-based polymers. The ethylene homopolymer, ethylene/alpha-olefin copolymer, ethylene/alpha-olefin multi-block copolymer, and/or POE comprises from 0 wt %, or 2 wt %, or 5 wt %, or 10 wt %, or 20 wt %, or 30 wt % to 40 wt %, or 50 wt %, or 60 wt %, or 70 wt % of the composition, based on the total weight of the composition. In an embodiment, the composition comprises from 0 wt %, or 2 wt %, or 5 wt %, or 10 wt %, or 15 wt % to 20 wt %, or 25 wt %, or 30 wt %, or 35 wt %, or 40 wt % of the ethylene homopolymer, ethylene/alpha-olefin copolymer, ethylene/alpha-olefin multi-block copolymer, and/or POE, based on the total weight of the composition.

In an embodiment, the composition comprises an ethylene-based polymer which is an ethylene/alpha-olefin multi-block copolymer. The composition comprises from 0 wt %, or 2 wt %, or 5 wt %, or 10 wt %, or 20 wt %, or 30 wt % to 40 wt %, or 50 wt %, or 60 wt %, or 70 wt % ethylene/alpha-olefin multi-block copolymer, based on the total weight of the composition. In an embodiment, the composition comprises from 0 wt %, or 2 wt %, or 5 wt %, or 10 wt %, or 15 wt % to 20 wt %, or 25 wt %, or 30 wt %, or 35 wt %, or 40 wt % ethylene/alpha-olefin multi-block copolymer, based on the total weight of the composition.

In an embodiment, the composition comprises an ethylene-based polymer and the composition comprises greater than or equal to 80 wt %, or greater than or equal to 85 wt %, or greater than or equal to 90 wt %, or greater than or equal to 95 wt %, or greater than or equal to 98 wt %, or greater than or equal to 99 wt %, or 100 wt %, based on the total weight of the composition.

In an embodiment, the composition comprises an ethylene-based polymer and the weight ratio of ionomer:ethylene-based polymer is from 1:4, or 1:3, or 2:5 to 3:7, or 1:2, or 2:3.

In an embodiment, or combination of embodiments, the composition comprises less than or equal to 1.00 wt %, or less than or equal to 0.50 wt %, or less than or equal to 0.20 wt %, or less than or equal to 0.10 wt %, or less than or equal to 0.05 wt % of an ethylene-based polymer, based on the total weight of the composition.

In an embodiment, or combination of embodiments, the composition comprises less than or equal to 1.00 wt %, or less than or equal to 0.50 wt %, or less than or equal to 0.20 wt %, or less than or equal to 0.10 wt %, or less than or equal to 0.05 wt % of a polyethylene, based on the total weight of the composition. In an embodiment the polyethylene is a polyethylene homopolymer, or further an LDPE.

In an embodiment, the composition is void of an ethylene-based polymer.

In an embodiment, the composition is void of an ethylene homopolymer or ethylene/alpha-olefin copolymer.

In an embodiment, the composition is void of an ethylene/alpha-olefin multi-block copolymer.

In an embodiment, the composition is void of a POE.

In an embodiment, the composition comprises from 0 wt %, or 10 wt %, or 20 wt %, or 30 wt % to 40 wt %, or 50 wt %, or 60 wt %, or 70 wt % propylene-based polymer, based on the total weight of the composition. In an embodiment, the composition comprises from 0 wt %, or 2 wt %, or 5 wt %, or 10 wt %, or 15 wt % to 20 wt %, or 25 wt %, or 30 wt %, or 35 wt %, or 40 wt % propylene-based polymer, based on the total weight of the composition.

In an embodiment, or combination of embodiments, the composition comprises less than or equal to 1.00 wt %, or less than or equal to 0.50 wt %, or less than or equal to 0.20 wt %, or less than or equal to 0.10 wt %, or less than or equal to 0.05 wt % of a propylene-based polymer, based on the total weight of the composition.

In an embodiment, the composition is void of a propylene-based polymer.

In an embodiment, the composition contains from 0 wt %, or 0.01 wt % to 0.3 wt %, or 0.5 wt %, or 1 wt %, or 2 wt %, or 3 wt %, or 5 wt % optional additive, based on the total weight of the composition.

In an embodiment, the composition has a single melting peak.

The composition may comprise one or more embodiments described herein.

Foam Bead

The present foam bead is formed from a composition comprising (A) an ionomer comprising, in polymerized form, ethylene, an unsaturated acid comonomer which is at least partially neutralized, and, optionally, an acrylate comonomer.

A "foam bead" is a foamed particle having a diameter from 4 mm, or 5 mm to 6 mm, or 7 mm; and/or a length from 4 mm, or 5 mm to 6 mm, or 7 mm.

In an embodiment, the foam bead comprises, or consists essentially of, or consists of from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the ionomer comprising, in polymerized form, ethylene, an unsaturated acid comonomer which is at least partially neutralized, and, optionally, an acrylate comonomer, based on the total weight of the foam bead. In an embodiment, the ionomer is a terpolymer comprising, in polymerized form, ethylene, an unsaturated acid comonomer which is at least partially neutralized, and an acrylate comonomer. In another embodiment, the ionomer is a terpolymer comprising, in polymerized form, ethylene, (meth) acrylic acid which is at least partially neutralized, and an alkyl acrylate comonomer, wherein the (meth) acrylic acid is at least partially neutralized with a magnesium ion.

In an embodiment, the foam bead has a single melting peak. In a further embodiment, the foam bead has a melting point, Tm, from 60° C., or 70° C., or 80° C., or 90° C., or 100° C., or 110° C., or 115° C. to 120° C., or 125° C., or 130° C., or 135° C.

In an embodiment, the foam bead has a heat of fusion, $H_f$, from greater than 0 J/g, or 1 J/g, or 5 J/g, or 10 J/g, or 15 J/g to 20 J/g, or 25 J/g, or 30 J/g, or 35 J/g, or 40 J/g.

In an embodiment, the foam bead has a foam density of less than 0.25 g/cc. In another embodiment, the foam bead has a foam density from 0.05 g/cc, or 0.09 g/cc, or 0.10 g/cc to 0.12 g/cc, or 0.14 g/cc, or 0.15 g/cc, or 0.20 g/cc, or less than 0.25 g/cc. Other features being equal, a lower foam density indicates a polymer or a polymer blend has improved foaming ability.

In an embodiment, the foam bead has an average cell size of less than or equal to 60 microns. In an embodiment, the foam bead has an average cell size from 5 microns, or 10 microns, or 15 microns, or 20 microns, or 25 microns to 30 microns, or 35 microns, or 40 microns, or 45 microns, or 50 microns. In an embodiment, the foam bead has an average cell size from 20 microns, or 25 microns, or 30 microns to 35 microns, or 40 microns, or 45 microns, or 50 microns. The average cell size D can be obtained through the analysis of SEM images of fractured sections of the foam bead.

D, the average cell size, can be calculated with the following equations:

$$D = \left(\frac{6V_t^2}{\pi N_f}\right)^{1/3}$$

wherein $V_t$ represents the expansion ratio of the foamed article and $N_f$ is the cell density (cell number per cubic centimeter volume of the foamed article) of the foamed article as calculated using the following equation:

$$N_f = \left(\frac{n_c M_c^2}{A_c}\right)^{3/2}$$

wherein $n_c$ is the cell number in the view area of the SEM picture, A, is the area of the SEM picture, and $M_c$ is the magnification.

In an embodiment, the foam bead has one, some, or all of the following properties: (i) a single melting peak; and/or (ii) a melting point, Tm, from 60° C., or 70° C., or 80° C., or 90° C., or 100° C., or 110° C., or 115° C. to 120° C., or 125° C., or 130° C., or 135° C.; and/or (iii) a heat of fusion, $H_f$, from greater than 0 J/g, or 1 J/g, or 5 J/g, or 10 J/g, or 15 J/g to 20 J/g, or 25 J/g, or 30 J/g, or 35 J/g, or 40 J/g; and/or (iv) a foam density of less than 0.25 g/cc; and/or (v) an average cell size from 5 microns, or 10 microns, or 15 microns, or 20 microns, or 25 microns to 30 microns, or 35 microns, or 40 microns, or 45 microns, or 50 microns. In another embodiment, the foam bead has a foam density from 0.05 g/cc, or 0.09 g/cc, or 0.10 g/cc to 0.12 g/cc, or 0.14 g/cc, or 0.15 g/cc, or 0.20 g/cc, or less than 0.25 g/cc. In a further embodiment, the foam bead has all of the above properties (i)-(v).

It is understood that the sum of the components in each of the foam beads disclosed herein, including the foregoing foam beads, yields 100 weight percent (wt %).

A nonlimiting example of a process for producing foam beads is described in Polymer, volume 56, pages 5-19 (2015), the entire contents of which are herein incorporated by reference.

In an embodiment, the components (i.e., the ionomer and any optional polymer and/or additives) are dry-blended, the blend is extruded, and the extrudate is pelletized. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm. The pellets are then saturated with a blowing agent to form a foam bead.

A "blowing agent" is a substance that is capable of producing a cellular structure in the composition via a foaming process. A nonlimiting example of a suitable blowing agent is a physical blowing agent. Nonlimiting examples of suitable physical blowing agents include an inert gas such as nitrogen ($N_2$), a carbon gas (e.g., CO, $CO_2$, etc.), helium, and argon; a hydrocarbon such as methane, propane, and butane (e.g., isobutane), pentane; and a halogenated hydrocarbon such as dichlorodifluoromethane, dichloromonofluoromethane, monochlorodifluoromethane, trichloromonofluoromethane, monochloropentafluoroethane, and trichlorotrifluoroethane. In an embodiment, the physical blowing agent is carbon dioxide ($CO_2$). A nonlimiting example of a suitable carbon dioxide is supercritical carbon dioxide. Supercritical carbon dioxide is a fluid state of carbon dioxide that is held at or above its critical temperature (31.10° C.) and critical pressure (7.39 MPa). In an embodiment, the blowing agent is a physical blowing agent to the exclusion of chemical blowing agents. In an embodiment, the pellet is contacted with the physical blowing agent at a temperature of from 100° C., or 110° C., or 115° C., or 120° C. to 125° C., or 130° C., or 135° C.

In an embodiment, the pellet is saturated with the physical blowing agent (e.g., supercritical carbon dioxide) via impregnation of the pellets with the blowing agent in an autoclave. The impregnating occurs at a temperature within 0° C. to 30° C. of the melting point of the ionomer. In a further embodiment, the impregnating occurs at a temperature from 40° C. or 45° C., or 50° C., or 55° C., or 60° C., or 65° C. to 70° C., or 75° C., or 80° C., or 85° C., or 90° C., or 95° C., or 100° C., or 105° C., or 110° C., or 115° C., or 120° C. In an embodiment, the impregnating occurs with a physical blowing agent pressure of from 5 MPa, or 8 MPa, or 10 MPa, or 11 MPa to 12 MPa, or 13 MPa, or 15 MPa, or 20 MPa, or 25 MPa, or 30 MPa and a saturation time of from 0.5 hours, or 1.0 hour to 1.5 hours, or 2.0 hours, or 3.0 hours. Following the saturation time, the autoclave is depressed to 25° C. and 0.1 MPa. During depression, the impregnated pellets expand to foam beads.

The foam bead may comprise one or more embodiments disclosed herein.

In an embodiment, the disclosure provides a composition comprising at least one foam bead as disclosed herein.

(E) Sintered Foam Structure

The instant disclosure provides a sintered foam structure. The sintered foam structure is formed from foamed beads that are formed from a composition comprising (A) an ionomer comprising, in polymerized form, ethylene, an unsaturated acid comonomer which is at least partially neutralized, and, optionally, an acrylate comonomer.

A sintered foam structure may comprise a combination of two or more embodiments as described herein.

In an embodiment, the present sintered foam structure is formed from foamed beads that are formed from a composition which further includes (B) an ethylene/α-olefin multi-block interpolymer, (C) a POE, and/or (D) one or more additives.

The (A) ionomer, (B) optional ethylene/α-olefin multi-block interpolymer, (C) optional POE, and (D) optional additives may be any respective (A) ionomer, (B) ethylene/α-olefin multi-block interpolymer, (C) POE, and (D) additive disclosed herein.

A sintered foam structure is an article formed via sintering of foam beads. The foam beads may be any foam bead disclosed herein. A nonlimiting method of sintering includes steam-chest molding. Steam-chest molding occurs at a temperature from 80° C., or 90° C. to 100° C., or 110° C., of 120° C., or 130° C., or 140° C. and/or a pressure from 0.05 MPa, or 0.1 MPa to 0.2 MPa, or 0.4 MPa. In another embodiment, the sintered foam structure is formed as described in Polymer, volume 56, pages 5-19 (2015), the entire contents of which are herein incorporated by reference.

In an embodiment, the sintered foam structure comprises, or consists essentially of, or consists of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the ionomer comprising, in polymerized form, ethylene, an unsaturated acid comonomer which is at least partially neutralized, and, optionally, an acrylate comonomer, or further the ionomer comprising, in polymerized form, ethylene, an unsaturated acid comonomer which is at least partially neutralized, and an acrylate comonomer, based on the total weight of the sintered foam structure.

In an embodiment, the combined amount of (A) the ionomer comprising, in polymerized form, ethylene, an unsaturated acid comonomer which is at least partially neutralized, and, optionally, an acrylate comonomer and any optional (B) ethylene/α-olefin multi-block interpolymer and/or (C) POE equals at least 80 wt % of the sintered foam structure. In another embodiment, the combined amount of (A) the ionomer comprising, in polymerized form, ethylene, an unsaturated acid comonomer which is at least partially neutralized, and, optionally, an acrylate comonomer and any optional (B) ethylene/α-olefin multi-block interpolymer and/or (C) POE equals from 80 wt %, or 85 wt %, or 90 wt % to 95 wt %, or 98 wt %, or 99 wt %, or 100 wt % of the total weight of the sintered foam structure.

In an embodiment, the sintered foam structure has an Asker C hardness from 35, or 40, or 45, or 50 to 55, or 60, or 65. In an embodiment, the sintered foam structure has an Asker C hardness from 45, or 50 to 55 or 60.

In an embodiment, the sintered foam structure has a foam density of less than 0.28 g/cc. In another embodiment, the sintered foam structure has a foam density from 0.125 g/cc, or 0.150 g/cc, or 0.175 g/cc, or 0.200 g/cc to 0.225 g/cc, or 0.250 g/cc, or 0.275 g/cc., or less than 0.280 g/cc. In another embodiment, the sintered foam structure has a density from 0.130 g/cc, or 0.140 g/cc, or 0.150 g/cc, or 0.160 g/cc, or 0.170 g/cc to 0.180 g/cc, or 0.190 g/cc, or 0.200 g/cc, or 0.210 g/cc, or 0.220 g/cc, or 0.230 g/cc, or 0.240 g/cc, or 0.250 g/cc, or 0.260 g/cc, or 0.270 g/cc, or less than 0.280 g/cc.

In an embodiment, the sintered foam structure has a falling ball rebound from 50%, or 55%, or 60%, or 65% to 70%, or 80%, or 90%. In an embodiment, the sintered foam structure has a falling ball rebound from 59%, or 60%, or 61%, or 62% to 63%, or 64%, or 65%, or 70%, or 80%, or 90%.

In an embodiment, the sintered foam structure has an average stress at break from greater than 0.50 MPa, or 0.55 MPa, or 0.60 MPa to 0.65 MPa, or 0.70 MPa, or 0.75 MPa, or 0.80 MPa, or 0.85 MPa, or 0.90 MPa, or 0.95 MPa, or 1.00 MPa, or 1.10 MPa.

In an embodiment, the sintered foam structure has a Type C Tear from 3.0 N/mm, or 3.5 N/mm, or 4.0 N/mm, or 4.5 N/mm, or 5.0 N/mm to 5.5 N/mm, or 6.0 N/mm, or 7.0 N/mm, or 10 N/mm, or 15 N/mm.

In an embodiment, the sintered foam structure has a linear shrinkage (70° C./40 minutes) of less than 5%. In another embodiment, the sintered foam structure has a linear shrinkage (70° C./40 minutes) from 0.1%, or 0.5%, or 1.0% to 1.5%, or 2.0%, or 2.5%, or 3.0%, or 4.0%, or less than 5.0%. In another embodiment, the sintered foam structure has a linear shrinkage (70° C./40 minutes) from 0.5%, or 0.75%, or 1.0%, or 1.25% to 1.50%, or 1.75%, or 2.0%, or 2.25%, or 2.5%, or 2.75%, or 3.0%.

In an embodiment, the sintered foam structure comprises, or consists essentially of, or consists of: (A) from 20 wt %, or 25 wt %, or 30 wt % to 35 wt %, or 40 wt %, or 45 wt %, or 50 wt %, or 55 wt %, or 60 wt %, or 65 wt %, or 70 wt %, or 75 wt %, or 80 wt %, or 85 wt %, or 90 wt %, or 95 wt %, or 98 wt %, or 99 wt %, or 100 wt % of the ionomer comprising, in polymerized form, ethylene, an unsaturated acid comonomer which is fully or partially neutralized, and, optionally, an acrylate comonomer, or further the ionomer comprising, in polymerized form, ethylene, an unsaturated acid comonomer which is fully or partially neutralized, and an acrylate comonomer, based on the total weight of the sintered foam structure. In an embodiment, the sintered foam structure has one, some, or all of the following properties: (i) an Asker C hardness from 35, or 40, or 45, or 50 to 55, or 60, or 65; and/or (ii) a foam density from 0.125 g/cc, or 0.150 g/cc, or 0.175 g/cc, or 0.200 g/cc to 0.225 g/cc, or 0.250 g/cc, or 0.275 g/cc, or less than 0.280 g/cc; and/or (iii) a falling ball rebound from 50%, or 55%, or 60%, or 65% to 70%, or 80%, or 90%; and/or (iv) an average stress at break from greater than 0.50 MPa, or 0.55 MPa, or 0.60 MPa to 0.65 MPa, or 0.70 MPa, or 0.75 MPa, or 0.80 MPa, or 0.85 MPa, or 0.90 MPa, or 0.95 MPa, or 1.00 MPa, or 1.10 MPa; and/or (v) a Type C Tear from 3.0 N/mm, or 3.5 N/mm, or 4.0 N/mm, or 4.5 N/mm, or 5.0 N/mm to 5.5 N/mm, or 6.0 N/mm, or 7.0 N/mm, or 10 N/mm, or 15 N/mm; and/or (vi) a linear shrinkage (70° C./40 minutes) from 0.1%, or 0.5%, or 1.0% to 1.5%, or 2.0%, or 2.5%, or 3.0%, or 4.0%, or less than 5.0%. In a further embodiment, the sintered foam structure has all of the above properties (i)-(vi). In an embodiment, the sintered foam structure optionally includes (B) an ethylene/α-olefin multi-block interpolymer, or further the ethylene/α-olefin multi-block copolymer, (C) a POE, and/or (D) additives.

In an embodiment, the sintered foam structure comprises, or consists essentially of, or consists of: (A) from 95 wt %, or 98 wt % to 99 wt %, or 100 wt % of the ionomer is a terpolymer comprising, in polymerized form, ethylene, an unsaturated acid comonomer which is at least partially neutralized, and, optionally, an acrylate comonomer, or further the ionomer comprising, in polymerized form, ethylene, an unsaturated acid comonomer which is at least partially neutralized, and an acrylate comonomer, wherein the unsaturated acid comonomer is at least partially neutralized with magnesium, based on the total weight of the sintered foam structure. In an embodiment, the sintered foam structure has one, some, or all of the following properties: (i) an Asker C hardness from 45, or 50 to 55 or 60; and/or (ii) a foam density from 0.130 g/cc, or 0.140 g/cc, or 0.150 g/cc, or 0.160 g/cc, or 0.170 g/cc to 0.180 g/cc, or 0.190 g/cc, or 0.200 g/cc, or 0.210 g/cc, or 0.220 g/cc; and/or (iii) a falling ball rebound from 59%, or 60%, or 61%, or 62% to 63%, or 64%, or 65%, or 70%, or 80%, or 90%, or 100% and/or (iv) an average stress at break from greater than 0.50 MPa, or 0.55 MPa, or 0.60 MPa to 0.65 MPa, or 0.70 MPa, or 0.75 MPa, or 0.80 MPa, or 0.85 MPa, or 0.90 MPa, or 0.95 MPa, or 1.00 MPa, or 1.10 MPa; and/or (v) a Type C Tear from 3.0 N/mm, or 3.5 N/mm, or 4.0 N/mm, or 4.5 N/mm, or 5.0 N/mm to 5.5 N/mm, or 6.0 N/mm, or 7.0 N/mm, or 10 N/mm, or 15 N/mm; and/or (vi) a linear shrinkage (70° C./40 minutes) from 0.5%, or 0.75%, or 1.0%, or 1.25% to 1.50%, or 1.75%, or 2.0%, or 2.25%, or 2.5%, or 2.75%, or 3.0%. In a further embodiment, the sintered foam structure has all of the above properties (i)-(vi).

In an embodiment, the disclosure provides an article comprising at least one component made from a sintered foam structure as disclosed herein.

Nonlimiting examples of suitable sintered foam structures include footwear (e.g., midsoles of footwear), packaging, sporting goods, construction materials, and insulation.

Test Methods

Asker C Hardness of sintered foam structures was measured in accordance with ASTM D2240 on plaques with the dimensions 20 cm (length)×10 cm (width)×1-2 cm (thickness). Each sample was measured 5 times (with a 5 second latency between each measurement) across the surface of the sample. The average was recorded.

Average Stress at Break was measured in accordance with ASTM D638. A sintered foam structure in the form of a plaque with the dimensions 20 cm (length)×10 cm (width)×1-2 cm (thickness) was cut into samples following the Type 4 specimen (one side skin on, dogbone, thickness 3-5 mm). The stress at break was measured at a testing speed of 20 inches/minute. The average of 3 samples was reported. The result was recorded in INSTRON 5565 in terms of MPa.

Density of the polymers was measured in accordance with ASTM D792, Method B. The result was recorded in grams (g) per cubic centimeter (g/cc or $g/cm^3$).

Falling ball rebound was measured by dropping a ⅝ inch (1.59 cm) diameter steel ball from a height of 500 mm onto a sintered foam structure in the form of a plaque with the dimensions 20 cm (length)×10 cm (width)×1-2 cm (thickness). The distance the ball rebounds off of the top surface of the plaque was measured in millimeters (mm). The falling ball rebound was calculated as a percentage using the following Equation: Falling Ball Rebound=(ball rebound distance×100)/500.

Foam density of sintered foam structures was measured by weighing a plaque with the dimensions 20 cm (length)×10 cm (width)×1-2 cm (thickness) and determining the volume (in cubic centimeter, $cm^3$) of the plaque using the length, width, and thickness of the plaque. The result was recorded in $g/cm^3$ (g/cc).

The density of the foam beads was measured by using water displacement method according to ASTM D792.

Linear shrinkage was measured on a vertically cut sample (vertical band saw) from an original sintered foam structure, in the form of a plaque with the dimensions 20 cm (length)×10 cm (width)×1-2 cm (thickness). Samples were cut using a vertical band saw to a sample size of 75 mm×75 mm×10 mm; each sample contained a top skin layer along the 10 mm thickness and a bottom skin layer along the 10 mm thickness. The length ($L_0$) of each sample was measured. Then, the samples were placed into an oven pre-heated to 70° C. The samples were heated in the oven for 40 minutes. After removing the samples from the oven, the samples were cooled for 24 hours at room temperature (23° C.). Then, the length ($L_1$) of each sample was measured. The change in length of the sample, reported as a percentage, is the linear shrinkage ($L_0$–$L_1$)/($L_0$).

Melt index (I2) was measured at 190° C. under a load of 2.16 kg according to ASTM D1238. The result was recorded in grams eluted per 10 minutes (g/10 min).

Type C Tear was measured in accordance with ASTM D624. A sintered foam structure in the form of a plaque with the dimensions 20 cm (length)×10 cm (width)×1-2 cm (thickness) was cut into samples following the Type C specimen specified in ASTM D624 (one skin on, thickness=3 mm). Type C Tear was measured at a testing speed of 20 inches/minute. The result was recorded in Newtons per millimeter (N/mm). An average of three samples is recorded.

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and first heating curves were recorded. The values determined are extrapolated onset of melting, $T_m$, and extrapolated onset of crystallization, $T_c$. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature were reported from the second heat curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis*, in *Thermal Characterization of Polymeric Materials* 92, 277-278 (Edith A. Turi ed., 2d ed. 1997).

Gel Permeation Chromatography (GPC) for Molecular Weight

A high temperature gel permeation chromatography (GPC) system, equipped with Robotic Assistant Deliver (RAD) system was used for sample preparation and sample injection. The concentration detector was an Infra-red detector (IR-5) from Polymer Char Inc. (Valencia, Spain). Data collection was performed using a Polymer Char DM 100 Data acquisition box. The carrier solvent was 1,2,4-trichlorobenzene (TCB). The system was equipped with an on-line solvent degas device from Agilent. The column compartment was operated at 150° C. The columns were four Mixed A LS 30 cm, 20 micron columns. The solvent was nitrogen-purged 1,2,4-trichlorobenzene (TCB) containing approximately 200 ppm 2,6-di-t-butyl-4-methylphenol (BHT). The flow rate was 1.0 mL/min, and the injection volume was 200 µl. A "2 mg/mL" sample concentration was prepared by dissolving the sample in $N_2$ purged and preheated TCB (containing 200 ppm BHT), for 2.5 hours at 160° C., with gentle agitation.

The GPC column set was calibrated by running twenty narrow molecular weight distribution polystyrene standards. The molecular weight (MW) of the standards ranges from 580 g/mol to 8,400,000 g/mol, and the standards were contained in six "cocktail" mixtures. Each standard mixture had at least a decade of separation between individual molecular weights. The equivalent polypropylene molecular weights of each PS standard were calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman, & P. M. Muglia, Macromolecules, 4, 507 (1971)):

$$M_{PP} = \left(\frac{K_{PS}M_{PS}^{a_{PS}+2}}{K_{PP}}\right)^{\frac{1}{a_{PP}+1}}, \qquad (Eq\ 1)$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum^i Wf_i}{\sum^i (Wf_i/m_i)}, \qquad (Eq\ 2)$$

$$M_w = \frac{\sum^i (Wf_i * M_i)}{\sum^i (Wf_i)}, \qquad (Eq\ 3)$$

where $Wf_i$ and $M_i$ are the weight fraction and molecular weight of elution component i, respectively.

The mass detector constant, laser light scattering detector constant and viscometer detector constant were determined using a standard reference (reference polymer is a linear polyethylene homopolymer) with a known value of weight average molecular weight (Mw=120,000 g/mol; dn/dc=−

0.104 mL/g; MWD=2.9) and intrinsic viscosity (1.873 dL/g). The chromatographic concentrations were assumed low enough to eliminate addressing second Virial coefficient effects (concentration effects on molecular weight).

The Systematic Approach for the determination of detector offset was implemented in a manner consistent with that published by Balke & Mourey et. al. (Mourey & Balke, Chromatography Polym. Chpt 12, (1992)) (Balke, Thitiratsakul, Lew, Cheung & Mourey, Chromatography Polym. Chpt 13, (1992)), using data obtained from the two detectors, while analyzing a standard reference (a linear polyethylene homopolymer) with a known value of weight average molecular weight (Mw=−120,000 g/mol; dn/dc=−0.104 mL/g; MWD=2.9) and intrinsic viscosity (1.873 dL/g) and narrow polystyrene standards. The Systematic Approach was used to optimize each detector offset to give molecular weight results as close as possible to those observed using the conventional GPC method.

The absolute weight average molecular weight Mw of the samples were characterized by the LS detector and IR-5 concentration detector using following equation:

$$Mw(\text{abs}) = K_{LS} * \frac{\Sigma(LS_i)}{\Sigma(IR_i)}, \quad (\text{Eq 4})$$

where $\Sigma(LS_i)$ is the response area of the LS detector, $\Sigma(IR_i)$ is the response area of the IR-5 detector, and $K_{LS}$ is the instrument constant which was determined using the standard reference (a linear polyethylene homopolymer) with a known value of weight average molecular weight (Mw=120,000 g/mol; dn/dc=−0.104 mL/g; MWD=2.9), intrinsic viscosity (1.873 dL/g) and concentration.

Some embodiments of the present disclosure will now be described in detail in the following Examples.

EXAMPLES

Materials used to produce foam beads and sintered foam structures are shown in Table 1 below.

TABLE 1

| Starting Materials | | |
|---|---|---|
| Component | Specification | Source |
| ENGAGE 8480 | ethylene/1-octene copolymer density = 0.902 g/cc; Shore A = 89; melt index (I2) 1.0 g/10 min; | The Dow Chemical Co. |
| SURLYN 8660 | ionomer of ethylene acid copolymer density = 0.95 g/cc; melt flow rate (MFR) = 10 g/10 min; melting point = 95° C.; Vicat softening point = 71° C. | DuPont |
| HPF AD1035 | ionomer of ethylene acid acrylate terpolymer density = 0.96 g/cc; melt flow rate (MFR) = 1.0 g/10 min; melting point = 69° C.; Vicat softening point = 54° C. | DuPont |
| HPF AD1172 | ionomer of ethylene acid acrylate terpolymer density = 0.95 g/cc; melt flow rate (MFR) = 1.25/10 min; melting point = 58° C.; Vicat softening point = 54° C. | DuPont |

TABLE 1-continued

| Starting Materials | | |
|---|---|---|
| Component | Specification | Source |
| INFUSE D9130.05 | ethylene/1-octene multi-block copolymer density = 0.886 g/cc; Shore A = 80; melt index (I2) = 1.5 g/10 min; melting point = 123.5° C.; single melting peak; $H_f$ = 52.2 J/g | The Dow Chemical Co. |

Polymers - 20-40 pellets per gram

A. Pelletizing—Blends and/or Micropellets

The components are premixed by dry blending in amounts as set forth in Table 2, below. Then, the pre-mixed dry blend was fed into the hopper of a Werner & Pfleiderer ZSK 40 Mc Plus co-rotating intermeshing twin screw extruder. The temperature profile was as follows: 180/180/180/180/185/185/185/180/180° C.

An underwater pelletizer from Gala Industries was used to prepare small round-shaped pellets containing the extrudate. The pellets had a diameter around 1-3 mm, and roughly 100-150 counts/gram.

TABLE 2

| Pellet Composition* | | | | | | |
|---|---|---|---|---|---|---|
| Component | IE1 | IE2 | IE3 | IE4 | CE1 | CE2 |
| SURLYN 8660 | 100 | | | 30 | | |
| HPF AD1035 | | 100 | | | | |
| HPF AD1172 | | | 100 | | | |
| INFUSE D9130.05 | | | | 70 | 100 | |
| ENGAGE 8480 | | | | | | 100 |

*wt % in Table 2 is based on the total weight of the pellet
IE = inventive example
CS = comparative sample The first heating curve (as measured by DSC) for each of IE1-IE4 and CE1-CE2, before foaming, is shown in FIG. 1.

B. Production of Foam Beads

Pellets are fed into an auto-clave equipped with a heating unit and gas injection valve. The auto-clave is heated to the foaming temperature provided in Table 3 below. At the same time, a blowing agent (high pressure $CO_2$) is injected into the auto-clave for saturation (0.5~2 hours).

Figure 2A:
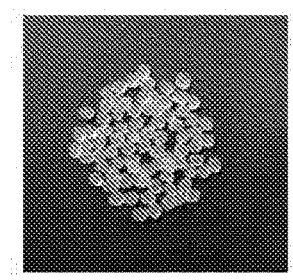
FIG. 2A is a picture showing polymer particles before foaming.
Figure 2B:
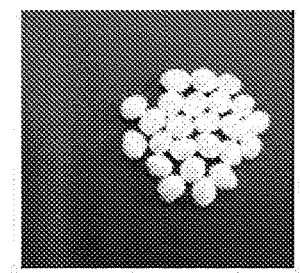
FIG. 2B is a picture showing foamed beads formed by foaming the polymer particles of FIG. 2A.

The auto-clave pressure varies depending on the resin type, but is typically 50-200 bar. After the polymer is fully saturated, a fast depressurization occurs and the foamed beads are formed. The foamed beads are conditioned at room temperature (23° C.) for several days to allow gas exchange between inside and outside of the foam beads. FIG. 2A is a photograph of exemplary polymer pellets before foaming. FIG. 2B is a photograph of the exemplary polymer pellets of FIG. 2A after foaming.

The composition and properties of the foam beads are provided below in Table 3.

TABLE 3

Composition and Properties of Foam Beads*

| | Composition | Foaming Temp. (° C.) | Foam Density (g/cc) | Crystallinity (%) | Tm (° C.) | $H_f$ (J/g) | Half Peak Width (° C.) |
|---|---|---|---|---|---|---|---|
| IE1 Foam Bead | IE1 Pellet (100 wt % SURLYN 8660) | 86 | 0.09-0.10 | 10.2 | 51.6 83.0 98.8 | 7.59 13.7 8.48 | 6.5 13.3 2.6 |
| IE2 Foam Bead | IE2 Pellet (100 wt % HPF AD1035) | 76 | 0.22-0.26 | 6.3 | 52.3 | 18.5 | 10.9 |
| IE3 Foam Bead | IE3 Pellet (100 wt % HPF AD1172) | 82 | 0.25 | 6.1 | 55.2 | 17.7 | 10.9 |
| IE4 Foam Bead | IE4 Pellet (30 wt % SURLYN 8660 and 70 wt % INFUSE D9130.05) | 111 | 0.07 | 12.5 | 59.5 87.3 119.6 | 2.84 2.36 31.2 | 10.8 10.9 4.1 |
| CS1 Foam Bead | CS1 Pellet (100 wt % INFUSE D9130.05) | 112 | 0.12-0.14 | 17.0 | 120.2 | 49.8 | 3.5 |
| CS2 Foam Bead | CS2 Pellet (100 wt % ENGAGE 8480) | 97 | 0.09-0.13 | 24.5 | 104.4 | 71.4 | 2.8 |

*wt % in Table 3 is based on the total weight of the foam bead
IE = inventive example
CS = comparative sample FIGS. 3A-3D are SEM images of the foam beads of IE1-IE3 and CS1, respectively.

Figure 3A:
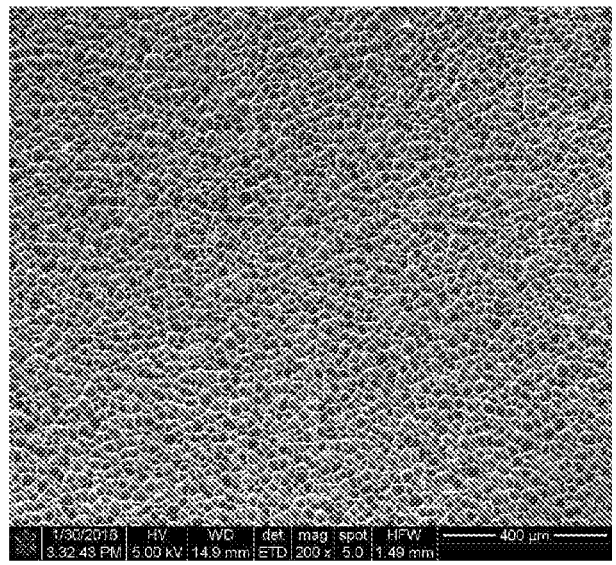
FIGS. 3A-3D are SEM images of the foam beads obtained with the compositions of Inventive Examples 1-3 and Comparative Sample 1, respectively.
Figure 3B:
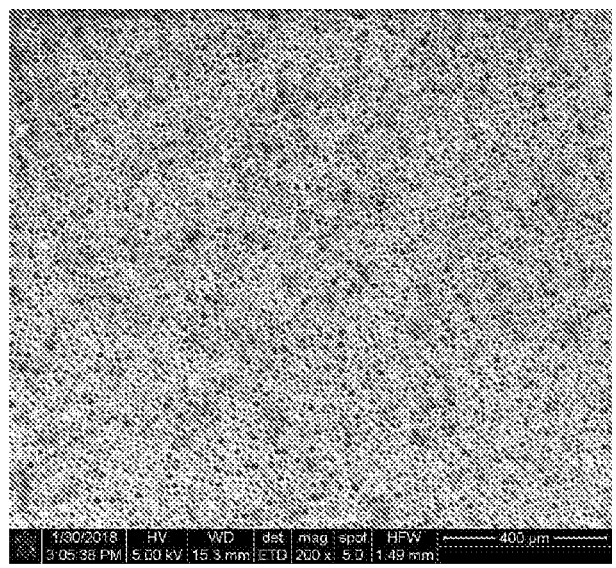
Figure 3C:
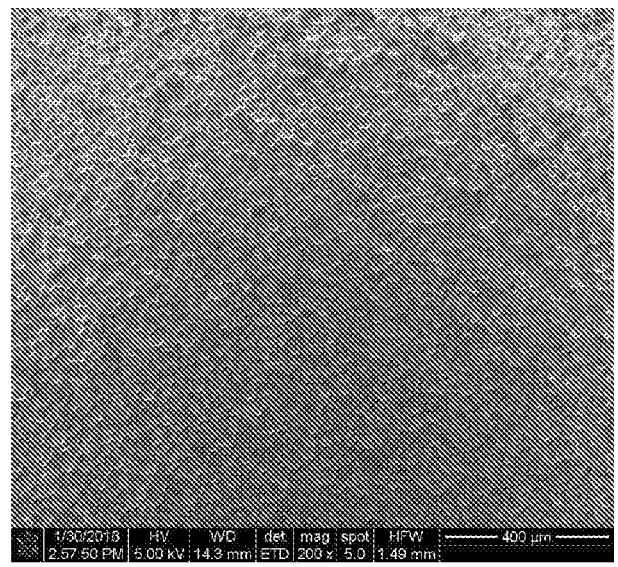

Foam beads IE1-IE3 are each based on a pure ionomer composition, i.e., the ionomer is the only polymeric component present in the composition used to prepare the foam bead. As shown in FIGS. 3A-3C, corresponding to IE1-IE3, respectively, the foam beads of such compositions have a cell size of less than 50 microns.

Figure 3D:
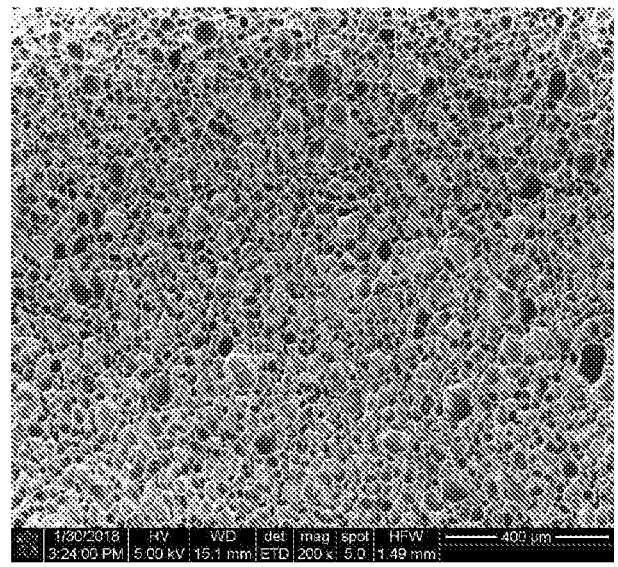

The compositions of CS1 and CS2, which contain no ionomer, result in foam beads which are larger and non-uniform in size. FIG. 3D shows the foam beads of composition CS1. The increase in size between the foam beads formed by IE1-IE3 and CS1 is easily observable.

IE4 is a composition containing a majority amount (70 wt %) of an ethylene/alpha-olefin multi-block copolymer and a minority amount (30 wt %) of an ionomer. As shown by CS1 in Table 3 and FIG. 3D, a composition of the ethylene/alpha-olefin multi-block copolymer alone results in foam beads having a foam bead density of 0.12-0.14 g/cc and inconsistent sizes ranging to greater than 60 microns. The addition of the ionomer to the ethylene/alpha-olefin multi-block copolymer unexpected decreases the foam bead density by approximately 50% (from 0.12-0.14 g/cc in CS1 to 0.07 g/cc in IE4).

Figure 4:
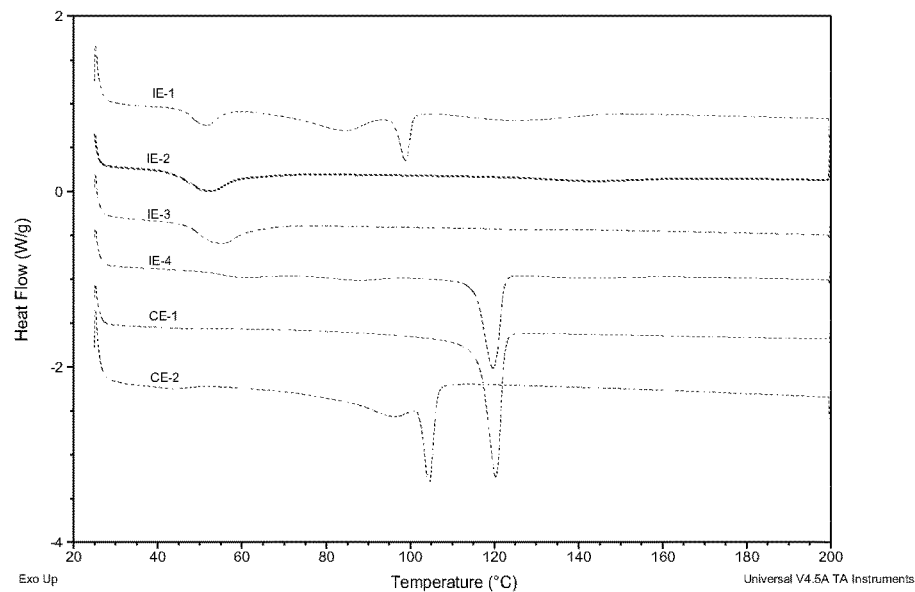
FIG. 4 is a graph showing the $1^{st}$ heating curve of the foam beads of Inventive Examples 1-4 and Comparative Samples 1 and 2, as measured by DSC.

The first heating curve (as measured by DSC) for each of IE1 Foam Bead-IE4 Foam Bead and CS1 Foam Bead-CS2 Foam Bead, before sintering, is shown in FIG. 4. As illustrated in FIG. 4, CS1 Foam Bead and CS2 Foam Bead each have a single, sharper melting peak meaning that the foam beads are not suitable for molding. Each of IE1 Foam Bead-IE4 Foam Bead includes either a single minor melting peak (i.e., as in IE2 Foam Bead and IE3 Foam Bead) or a minor first melting peak and a second slightly bigger melting peak (i.e., as in IE1 Foam Bead and IE4 Foam Bead). Not to be bound by any particular theory, it is believed that ionic crosslinking of the ionomers used in IE1 Foam Bead-IE4 Foam Bead leads to high melt strength and high viscosity, particularly in IE2 Foam Bead and IE3 Foam Bead which have the single melting peak. As a result, each of IE1 Foam Bead-IE4 Foam Bead is usable for molding, and particularly steam chest molding.

C. Sintering

Sintered foam structures were formed from the foam beads. Foamed beads were vacuum sucked into a steam chesting mold. Then, high pressure steam was injected into the mold to heat/melt the foam beads' surface. At the same time, the mold was closed to achieve inter-bead sintering. The steam pressure was dependent on the resin type contained in the foam beads. Sintering was followed by a water cooling process and a vacuum process to remove water from the sintered foam structure. The whole cycle time was 2-5 min. The prepared sintered foam structure was a plaque with the following dimensions: 20 cm (length)×10 cm (width)× 1-2 cm (thickness). The steam pressure is from 0.5 Bar to 1.0 Bar. The sintered foam structure has two skin layers along the 1-2 cm thickness of the structure. Each skin layer is in contact with the mold surface before the sintered foam structure is removed from the mold.

The composition and properties of the sintered foam structures are provided below in Table 4. All properties in Table 4, with the exception of linear shrinkage, measured the skin performance of the sintered foam structure.

TABLE 4

Composition and Properties of Sintered Foam Structures*

| | IE2 Structure | IE3 Structure | CS1 Structure |
|---|---|---|---|
| Composition | IE2 Foam Bead (100 wt % HPF AD1035) | IE3 Foam Bead (100 wt % HPF AD1172) | CS1 Foam Bead (100 wt % INFUSE D9130.05) |
| Foam Density | 0.22-0.26 g/cc | 0.25 g/cc | 0.24 g/cc |
| Asker C | 50.2 | 53.2 | 30.6 |
| Falling Ball Rebound | 59.0% | 64.7% | 58.4% |
| Average Stress at Break | 0.61 MPa | 1.02 MPa | 0.47 MPa |
| Type C Tear | 6.17 N/mm | 10.27 N/mm | 2.97 N/mm |
| Linear Shrinkage | 2.8% | 0.9% | 0.4% |

Figure 5A:
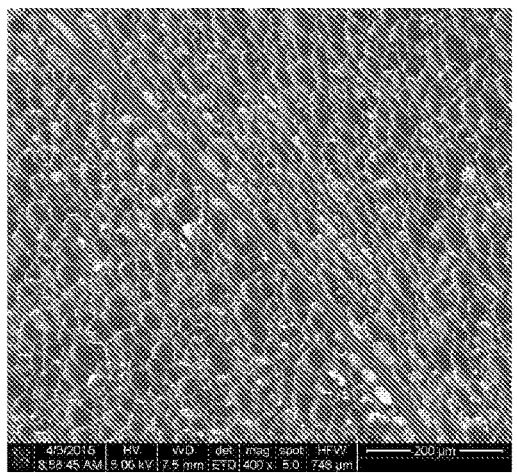
FIGS. 5A-5B are SEM images of the sintered foam structures obtained with the compositions of Inventive Example 3 and Comparative Sample 1, respectively.
Figure 5B:
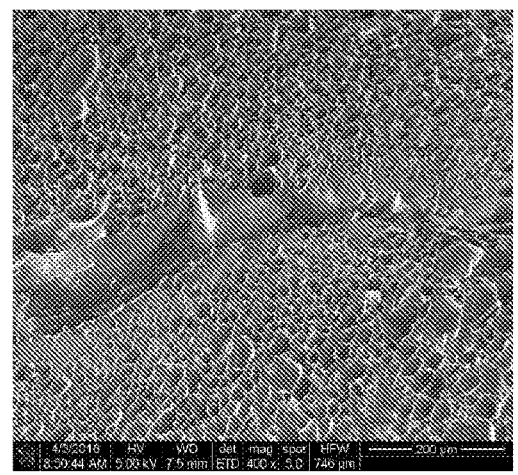

*wt % in Table 4 is based on the total weight of the sintered foam structure
IE = inventive example CS = comparative sample FIGS. 5A-5B are SEM images of the sintered foam structures obtained with the compositions of Inventive Example 3 and Comparative Sample 1, respectively.

It has been discovered that sintered foam structures formed from foam beads containing (A) an ionomer comprising, in polymerized form, ethylene, an unsaturated acid comonomer which is fully or partially neutralized and, optionally, an acrylate comonomer, and further, an ionomer comprising, in polymerized form, ethylene, an unsaturated acid comonomer which is fully or partially neutralized, and an acrylate comonomer, exhibit (i) higher Asker C hardness (greater than 35); (ii) higher falling ball rebound (greater than or equal to 59%); (iii) higher average stress at break (greater than 0.50 MPa); and (iv) higher Type C Tear (greater than 3 N/mm), than a comparative sintered foam structure containing ethylene/alpha-olefin multi-block copolymer and void of an ionomer comprising, in polymerized form, ethylene, an unsaturated acid comonomer which is fully or partially neutralized and, optionally, an acrylate comonomer (Compare IE2 Structure and IE3 Structure to CS1 Structure).

Not to be bound by any particular theory, the poor mechanical performance of the CS1 Structure, i.e., the lower average stress at break (less than 0.50 MPa), and lower Type C tear strength (less 3 N/mm) is attributable to poor inter-bead fusing. The voids/defects caused by poor sintering, as shown in FIG. 5B, significantly reduces the mechanical performance of the CS1 Structure. In contrast, the IE3 Structure shows good sintering, as shown in FIG. 5A which is thought to contribute to the improvement in mechanical performance.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A sintered foam structure formed from foam beads that are formed from a composition comprising:
   an ionomer comprising, in polymerized form, ethylene, an unsaturated acid comonomer,
   and, optionally, an acrylate comonomer,
   wherein the unsaturated acid comonomer is completely or partially neutralized with a neutralizing agent,
   wherein the ionomer has a melting point from 55° C. to 70° C.,
   wherein the sintered foam structure has:
   i) an Asker C hardness from 45 to 55;
   ii) a foam density from 0.130 g/cc to 0.280 g/cc;
   iii) a falling ball rebound from 55% to 65%;
   iv) an average stress at break from 0.55 MPa to 1.00 MPa; and
   v) a Type C Tear from 5.0 N/mm to 15 N/mm.

2. The sintered foam structure of claim 1, wherein the ionomer has a crystallinity from 4% to 20%.

3. The sintered foam structure of claim 1, wherein the composition comprises the ionomer to the exclusion of all other polymers.

4. The sintered foam structure of claim 1, wherein the composition comprises at least one additional polymer selected from the group consisting of ethylene-based polymers, propylene-based polymers, and combinations thereof.

5. The sintered foam structure of claim 1, wherein the ionomer is a terpolymer of ethylene, the unsaturated acid comonomer, and the acrylate comonomer.

6. The sintered foam structure of claim 1, wherein the ionomer has a density from 0.948 g/cc to 0.962 g/cc.

7. An article comprising at least one component formed from the sintered foam structure of claim 1.

* * * * *